United States Patent [19]

Meiss

[11] 4,023,608

[45] May 17, 1977

[54] PNEUMATIC VEHICLE TIRE

[75] Inventor: Barthold Meiss, Anderten, Germany

[73] Assignee: Continental Gummi-Werke Aktiengesellschaft, Hannover, Germany

[22] Filed: Sept. 9, 1974

[21] Appl. No.: 504,492

[30] Foreign Application Priority Data

Sept. 8, 1973  Germany ........................ 2345387

[52] U.S. Cl. .......................... 152/362 R; 152/354; 152/374
[51] Int. Cl.² ...................... B60C 15/06; B60C 9/02
[58] Field of Search ......... 152/362 R, 362 CS, 354, 152/355, 357, 374

[56] References Cited

UNITED STATES PATENTS

| | | | |
|---|---|---|---|
| 3,052,275 | 9/1962 | Hylbert ........................ | 152/362 X |
| 3,232,331 | 2/1966 | Cappa et al. ................... | 152/354 |
| 3,301,303 | 1/1967 | Travers ......................... | 152/362 R |
| 3,542,108 | 11/1970 | Rye et al. ...................... | 152/354 |
| 3,612,138 | 10/1971 | Ravenhall ...................... | 152/362 R |
| 3,638,705 | 2/1972 | Devienne et al. ............. | 152/362 X |
| 3,772,568 | 3/1973 | Maiocchi ....................... | 152/362 CS |

*Primary Examiner*—Drayton E. Hoffman
*Attorney, Agent, or Firm*—Walter Becker

[57] ABSTRACT

A pneumatic vehicle tire with a carcass the layers of which are anchored at the beads by being looped around the bead cores. On each of the bead cores there is arranged a rubber profile of approximately triangular cross section laterally engaging a carcass layer, while laterally outwardly of and adjacent to each rubber profile a rubber plate is provided which is considerably harder than the respective adjacent rubber profile and the rim portions of which taper to a thin edge. Each of the rubber plates engages on opposite sides the respective adjacent carcass layers and extends in the direction toward the respective adjacent tire shoulder to a height of up to one-third or even one-half of the respective adjacent tire side wall.

6 Claims, 2 Drawing Figures

PNEUMATIC VEHICLE TIRE

The present invention relates to a pneumatic vehicle tire with a carcass, the layers of which are anchored in the beads by being looped around the bead cores while upon the bead cores there is arranged a rubber profile which has an approximately triangular cross section, said rubber profile laterally engaging the carcass layers.

It is known to reinforce the smaller section of the tire side walls which has a smaller diameter. This is effected by piling up material.

It is an object of the present invention likewise to provide a reinforcement of the tire side walls but to bring such reinforcement about by a cooperation of certain carcass layers with the rubber body so that with the relatively thin wall thickness of the tire side wall, a high degree of reinforcement can be realized.

This object and other objects and advantages of the invention will appear more clearly from the following specification, in connection with the accompanying drawing, in which.

Figure 1:
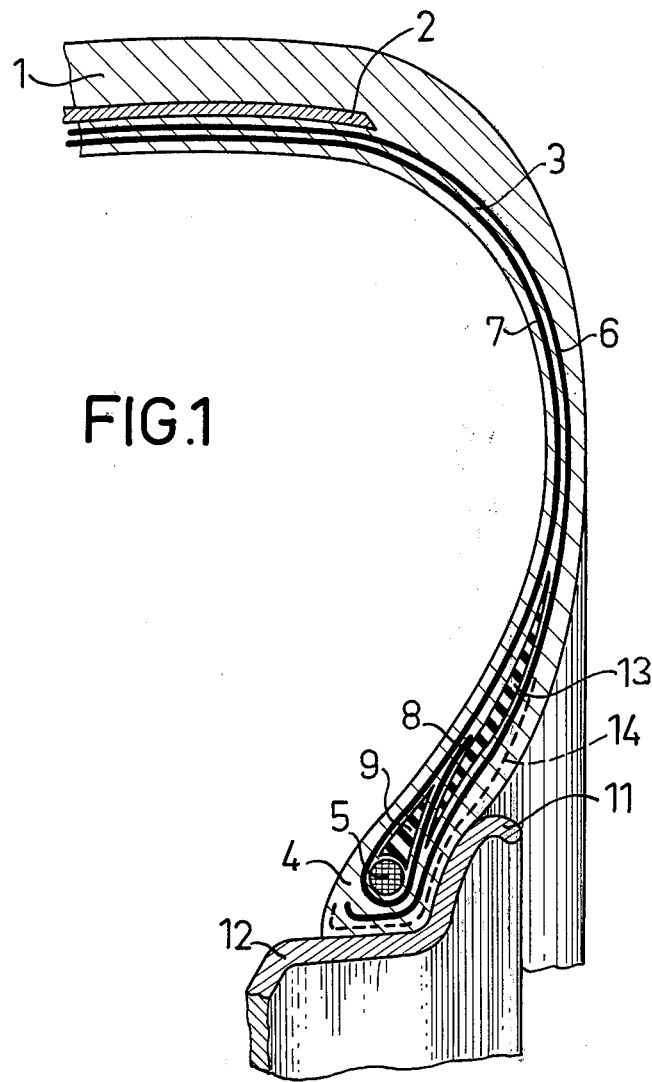
FIG. 1 illustrates a radial partial section through a pneumatic vehicle tire, only one-half of the cross section being shown.

The vehicle tire according to the invention is characterized primarily in that laterally outwardly, in addition to the rubber profile, there is provided a rubber plate which is considerably harder than said profile and tapers at its edges to a point, said rubber plate on all sides engages carcass layers and extends from the bead core up to approximately from one-third to approximately one-half of the height of the side wall of the tire. Due to this rubber plate in cooperation with the carcass layers surrounding said rubber plate, an effective and dynamically efficient reinforcement of the tire side wall is obtained which over other tire side walls does not result in an undue thickening of the tire side wall.

Referring now to the drawing in detail, the tire body primarily consisting of rubber or rubber-like materials is provided with a tread strip 1 and a belt 2 reinforcing the tread strip zone, and furthermore has a two-layer carcass 3. This carcass 3 extends from one bead 4 to the other bead 4 and is anchored at the bead cores 5 by being looped therearound. The layers 6 and 7 forming the carcass 3 comprise thread-shaped strength carriers arranged in cord position and located in radial planes with regard to the tire or approximately in said planes. The rim of the inner layer 7 is anchored by being looped from the inside around the bead core 5, and the outer layer 6 is anchored by being looped from the outside around the bead core 5.

The free edge or rim 8 of the layer 7 extends not only around the bead core 5 consisting of steel, or the like, but also a substantially triangular rubber profile 9 having a hardness in a range of from about 58 to 68 Shore, preferably approximately 65 Shore. The free rim 8 of layer 7 engages the outer surface of layer 7 above the rim horn 11 of the rim 12 provided for the tire. Between the layer 7 and the layer 6 there is provided a rubber plate 13 which has a hardness considerably greater than that of the rubber profile means and more particularly in a range of from about 80 to 95 Shore, preferably approximately 85 Shore and tapers to a line at the inner and the outer diameter. The smaller inner diameter of the rubber plate 13 approximately corresponds to the outer diameter of the bead core 5, whereas the outer larger diameter of the rubber plate 13 extends over a length amounting to up to one-half of the pertaining tire side wall, preferably about a third of the height of the tire side walls of the tire body. Accordingly, the rubber plate 13 is enclosed on all sides and consequently brings about the desired reinforcement of the tire side wall within the region of its smaller diameter. In a customary manner, the tire body may, within the region of its beads be protected by a bead protective band 14. The greater wall thickness of each rubber plate means 13 corresponds to about half the axial extension of the pertaining bead core. Each of the rubber profile means 9 extends merely over a length equalling about the smallest third in diameter of the respective adjacent rubber plate means.

With the embodiment according to FIG. 1, the two layers 6, 7 are in opposite direction looped around the bead cores 5.

Figure 2:
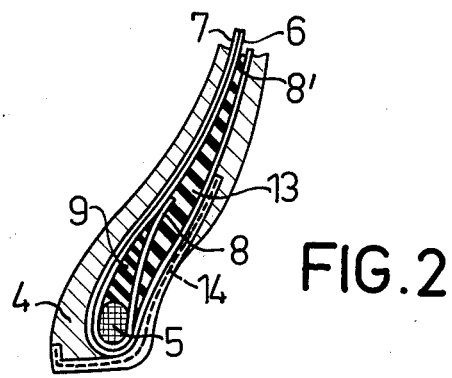
FIG. 2 is a section through the bead portion of a modified tire according to the invention.

According to the embodiment of FIG. 2, both layers 6, 7 are from the inside passed toward the outside around the bead cores 5 while forming free edges or rims 8 and 8'. Of these rims, rim 8 corresponds as to its function and size to the rim 8 according to FIG. 1, whereas the free rim 8' laterally outwardly serves for covering up the rubber plate 13 and consequently projects beyond the rubber plate 13 at its outer diameter. Also, in this instance, the additional reinforcement is effected by the rubber plate 13 which, also in this instance is on both sides enclosed by carcass layers.

It is, of course, to be understood that the present invention is, by no means, limited to the specific showing in the drawing, but also comprises any modifications within the scope of the appended claims.

What I claim is:

1. A pneumatic vehicle tire with beads each including a core and with tire shoulders which includes in combination: a multilayer carcass having inner and outer carcass layers thereof looped around said beads to anchor said said layers thereon and each having a turn-up portion, rubber profile means of triangular cross section each including an overlapping portion respectively arranged on said bead cores and laterally engaging the inner carcass layer, and rubber plate means each including a lower portion and an upper portion respectively arranged radially inwardly near said bead cores and having opposite side surfaces engaged by said inner and outer carcass layers respectively radially outwardly and also radially inwardly subject to interposing of said rubber profile means looped within the inner layer, said rubber plate means having both rim portions adjacent said bead cores and rim portions opposite to said first mentioned rim portions tapering to a sharp edge, each of said rubber plate means having a hardness in a range at a value always greater than that of said rubber profile means and covering a distance from the respective adjacent bead core in the direction toward the respective adjacent tire shoulder over a length amounting to up to one-half of the pertaining tire side wall, said inner carcass layer wrapping around said bead core and the rubber profile means and extending between said rubber profile means and the overlapping portion of said rubber plate means, said lower portion of said plate means extending between the turn-up portion of the inner carcass layer and the outer carcass layer and the upper portion of said rubber plate portion extending up to one-half the height of the side wall and being positioned between said inner and outer carcass layers.

2. A tire in combination according to claim 1, in which each of said rubber plate means covers the respective adjacent bead core in the direction toward the respective adjacent tire shoulder over a length amounting to up to one-third of the pertaining tire side wall.

3. A tire in combination according to claim 2, in which said rubber profile means has a hardness of from about 58 to 68 Shore, whereas said rubber plate means has a hardness of from about 80 to 95 Shore.

4. A tire in combination according to claim 1, in which said rubber profile means has a hardness of about 65 Shore whereas said rubber plate means has a hardness of about 85 Shore.

5. A tire in combination according to claim 1, in which the greatest wall thickness of each of said rubber plate means corresponds to about half the axial extension of the pertaining bead core.

6. A tire in combination according to claim 1, in which each of said rubber profile means extends merely over a length equaling about the smallest third in diameter of the respective adjacent rubber plate means.

* * * * *